United States Patent [19]
Fujii et al.

[11] Patent Number: 5,210,643
[45] Date of Patent: May 11, 1993

[54] WAVE COMBINING APPARATUS FOR SEMICONDUCTOR LASERS

[75] Inventors: Yoshiaki Fujii; Michihiko Sakurai; Yujiro Ito, all of Kanagawa, Japan

[73] Assignee: Sony Corporation, Tokyo, Japan

[21] Appl. No.: 751,527

[22] Filed: Aug. 29, 1991

[30] Foreign Application Priority Data

Aug. 31, 1990 [JP] Japan ................... 2-231355

[51] Int. Cl.[5] ............................................. G02F 27/10
[52] U.S. Cl. ............................ 359/638; 359/618; 359/629; 359/634; 385/36
[58] Field of Search ............... 359/641, 633, 634, 638, 359/618, 629; 385/36

[56] References Cited

U.S. PATENT DOCUMENTS

| | | | |
|---|---|---|---|
| 4,159,452 | 6/1979 | Logan et al. | 331/94.5 |
| 4,466,087 | 8/1984 | Cheng | 369/45 |
| 5,056,887 | 10/1991 | Oshima | 359/638 |

FOREIGN PATENT DOCUMENTS

| | | |
|---|---|---|
| 0268523 | 5/1988 | European Pat. Off. . |
| 54-076108 | 6/1979 | Japan . |
| 60-253033 | 12/1985 | Japan . |
| 2-029713 | 1/1990 | Japan . |

Primary Examiner—James W. Davie
Attorney, Agent, or Firm—Hill, Steadman & Simpson

[57] ABSTRACT

A wave combining apparatus for semiconductor lasers includes first and second dichroic mirrors for combining laser beams having the same direction of oscillation by waveform division, respectively, and a polarizing beam splitter prism for combining the first and second resultant beams into a single, combined waveform.

12 Claims, 8 Drawing Sheets

WAVE COMBINING APPARATUS FOR SEMICONDUCTOR LASERS

BACKGROUND OF THE INVENTION

1. Field of the Invention

The present invention relates to a wave combining apparatus for semiconductor lasers, wherein a plurality of laser beams emitted from a plurality of semiconductor lasers are combined to produce a single, efficient laser beam having a high light concentration.

2. Description of the Related Art

Laser beams have been used in many fields (for example, medical treatment and optical working) particularly for marking. In order to use laser beams in such fields, however, the laser beams must have significantly high light concentration. Thus, in order for a semiconductor laser having low power output to be used, it is necessary to increase the light concentration of the beam. The light concentration of a semiconductor laser beam can be increased with a wave combining apparatus. A wave combining apparatus uses optical components, such as polarizing beam splitter prisms and dichroic mirrors to couple a number of laser beams emitted from a number of semiconductor lasers.

SUMMARY OF THE INVENTION

It is an object of the present invention to provide a wave combining apparatus for semiconductor lasers having a high total wave combining efficiency $\eta$. Further, it is an object of the present invention to provide a wave combining apparatus for semiconductor lasers, wherein laser beams having a first direction of oscillation are combined in a dichroic mirror by wavelength division to produce a first resultant beam, and laser beams having a second direction of oscillation are combined in another dichroic mirror by waveform division to produce a second resultant beam, and the first and second resultant beams are passed through a polarizing beam splitter prism to produce a single laser beam. Thus, by passing laser beams having the same direction of oscillation into respective dichroic mirrors, the wave combining efficiency $\eta$ of the dichroic mirrors is greatly improved.

Yet another object of the present invention is to provide a wave combining apparatus for a semiconductor laser having a high total coupling efficiency $\eta$, wherein the wave combining apparatus includes at least two semiconductor lasers for producing laser beams of a first direction of oscillation. The laser beams of the first direction of oscillation are combined in a dichroic mirror by waveform division to form a second resultant beam. At least one laser beam of a second direction of oscillation is produced by at least one second semiconductor laser and is passed through a second dichroic mirror to form a second resultant beam. The first and second resultant beams, produced from the first and second dichroic mirrors respectively, are then combined by a polarizing beam splitter prism into a single beam, wherein the single beam is coupled to an optical fiber.

Yet another object of the present invention is to provide a wave combining apparatus for a semiconductor laser having a high wave coupling efficiency $\eta$, wherein optical components, such as cylindrical lenses, are interposed between each of the dichroic mirrors and the polarizing beam splitter prism to produce a single laser beam having a desired shape.

DESCRIPTION OF THE PREFERRED EMBODIMENTS

Figure 1:
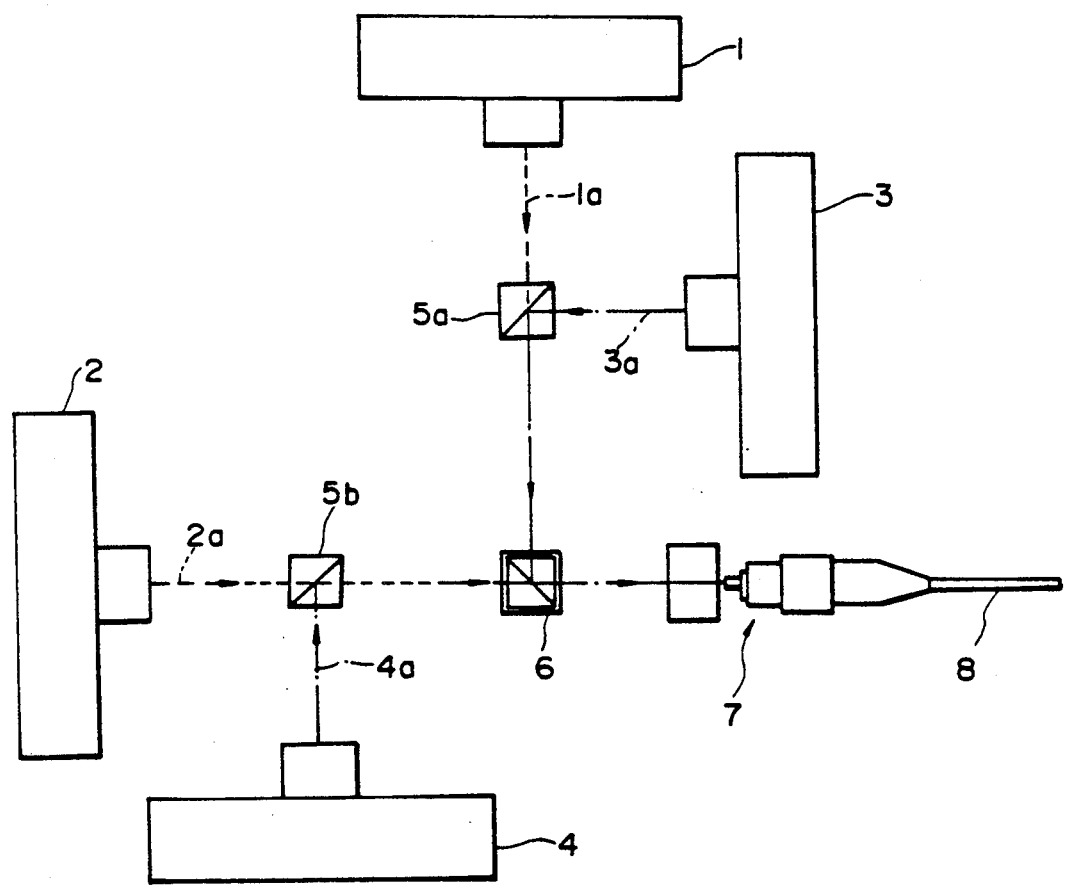
FIG. 1 is a diagrammatic view illustrating a conventional wave combining apparatus.

Referring to FIG. 1, a conventional wave combining apparatus includes semiconductor lasers 1, 2, 3, and 4. Semiconductor lasers 1 and 2 emit P polarized laser beams 1a and 2a, respectively. Semiconductor lasers 3 and 4 emit S polarized laser beams 3a and 4a, respectively. Laser beams 1a and 3a each have a wavelength of $\lambda = 780$ nm. Laser beams 2a and 4a each have a wavelength of $\lambda = 830$ nm.

As illustrated in FIG. 1, laser beam 1a is a perpendicular to laser beam 3a. Further, laser beam 2a is perpendicular to laser beam 4a.

In the known wave combining apparatus, laser beam 1a, which is P polarized, and laser beam 3a, which is S polarized, are introduced into a first polarizing beam splitter prism 5a, while laser beam 2a, which is P polarized, and laser beam 4a, which is S polarized, are introduced into a second polarizing beam splitter prism 5b.

The polarizing beam splitter prisms 5a and 5b are constructed using a pair of 45° rectangular prisms. Each prism has an inclined face. And alternate multi-layer film, consisting of a plurality of alternate layers of a high refractive index and layers of a low refractive index, are adhered to each other into a cubic body, and applied to the inclined face of each prism. The polarizing beam splitter prisms 5a and 5b make use of the phenomenon that, when certain conditions are satisfied, the reflectance of P polarized laser beams oscillates in parallel to an incidence plane, while the reflectance of S polarized laser beams increases as the number of alternate layers of the multi-layer film increases. Thus, laser beams 1a, 2a, 3a, and 4a can either pass with a low loss through, or be reflected by, the polarizing beam splitter prisms 5a and 5b, depending on the direction of oscillation of the laser beam. Thus, laser beams 1a and 3a are combined to form a first PS beam by the first polarizing beam splitter prism 5a, and laser beams 2a and 4a are combined to form a second PS beam by the second polarizing beam splitter prism 5b.

The first and second PS beams are then introduced into a dichroic mirror 6, where the first PS beam is disposed perpendicularly to the second PS beam, as shown in FIG. 1. The first and second PS beams then pass with a low loss through, or are reflected in a perpendicular direction by, the dichroic mirror 6, depending on differences in wavelength. The first and second PS beams are combined into a single laser beam with the dichroic mirror 6, and then, are coupled to an optical fiber 8 by means of an optical coupler 7.

Thus, the conventional wave combining apparatus, illustrated in FIG. 1, provides PS wave combination by the beam splitter prisms 5a and 5b, which takes place prior to a further wave combination by the dichroic mirror 6. The first and second PS beams introduced into the dichroic mirror 6 include a mixture of P polarized waves and S polarized waves. When P polarized waves and S polarized waves are so combined, it is difficult to improve the wave combining characteristic, or efficiency, of the wave combining apparatus. In particular, a dichroic mirror normally has the spectral characteristics illustrated either in FIGS. 2A and 2B or in FIGS. 3A and 3B. In FIGS. 2A, 2B and 3A, 3B, a characteristic curve R, indicated by a broken line, represents a reflection characteristic of a laser beam, while a characteristic curve T, indicated by a solid line, represents a transmission characteristic.

Figure 2A:
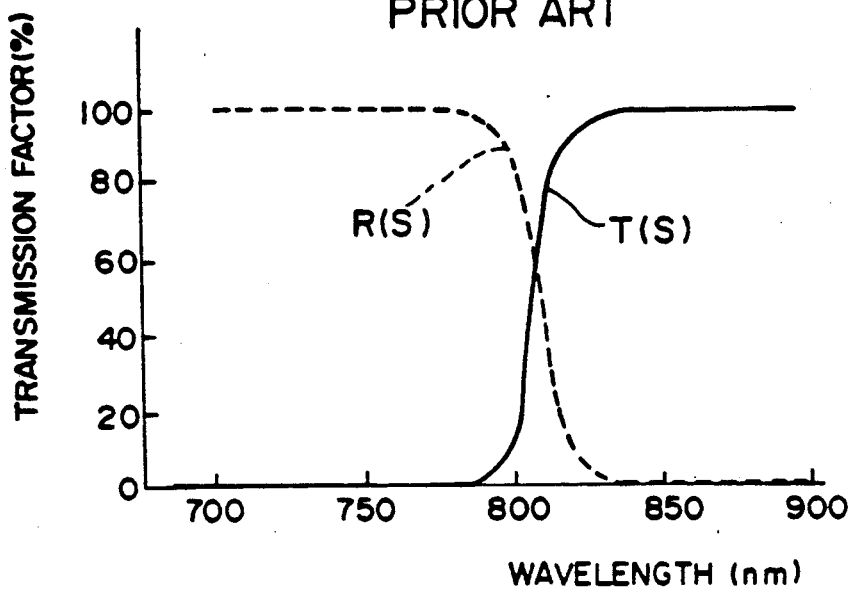
FIGS. 2A and 2B are graphs illustrating exemplary spectral characteristics of one type of dichroic mirror.
Figure 2B:
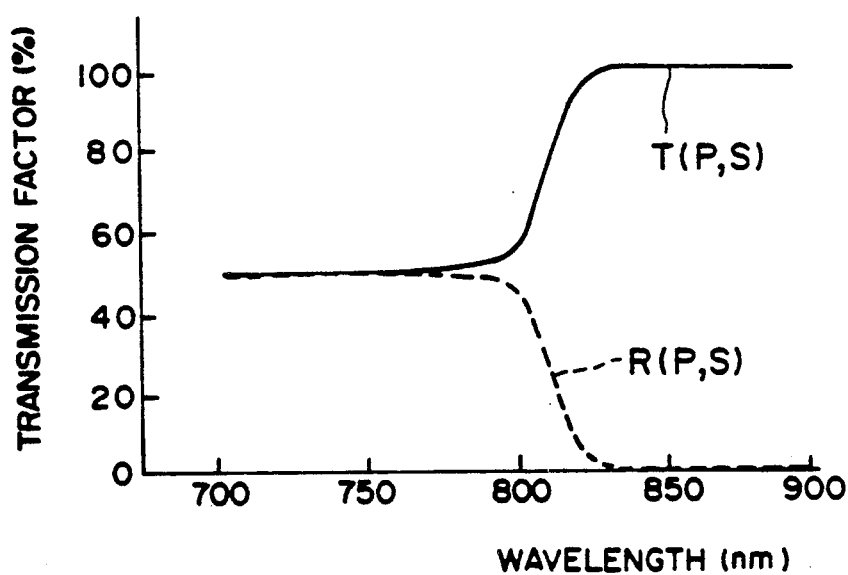

Thus, in the conventional wave combining apparatus, since P polarized and S polarized waves are combined prior to their introduction to the dichroic mirror 6, even if a dichroic mirror having the spectral characteristics illustrated in FIGS. 2A and 2B is used, the wave combining efficiency is very low. Further, even if a dichroic mirror having the spectral characteristics illustrated in FIGS. 3A and 3B is used, the wave combining efficiency is very low.

For example, where a dichroic mirror having the spectral characteristics illustrated in FIGS. 2A and 2B is used in a wave combining apparatus, the transmission factor $\eta_{830}$ of the dichroic mirror at the wavelength of 830 nm is high at $\eta_{830}=0.97$. However, the reflectance $\eta_{780}$ at the wavelength of 780 nm is significantly low at $\eta_{780}=0.5$.

Figure 3A:
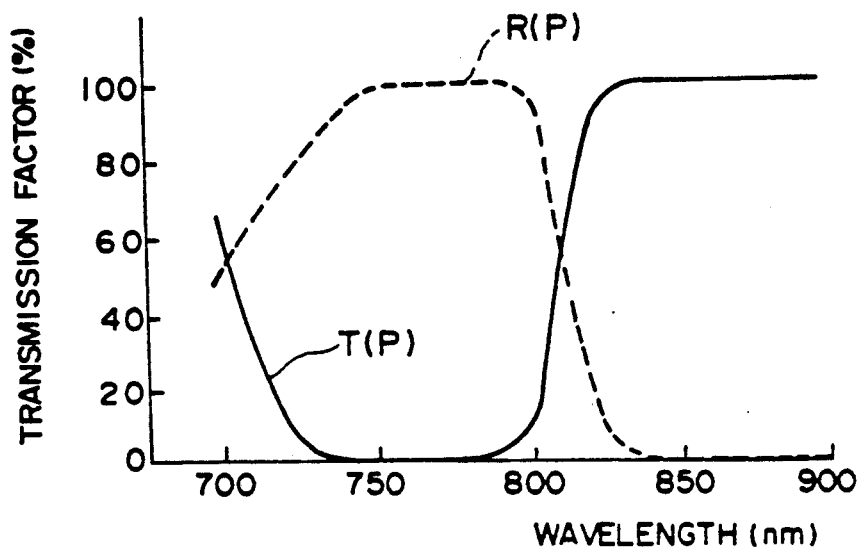
FIGS. 3A and 3B are graphs illustrating exemplary spectral characteristics of another type of dichroic mirror.
Figure 3B:
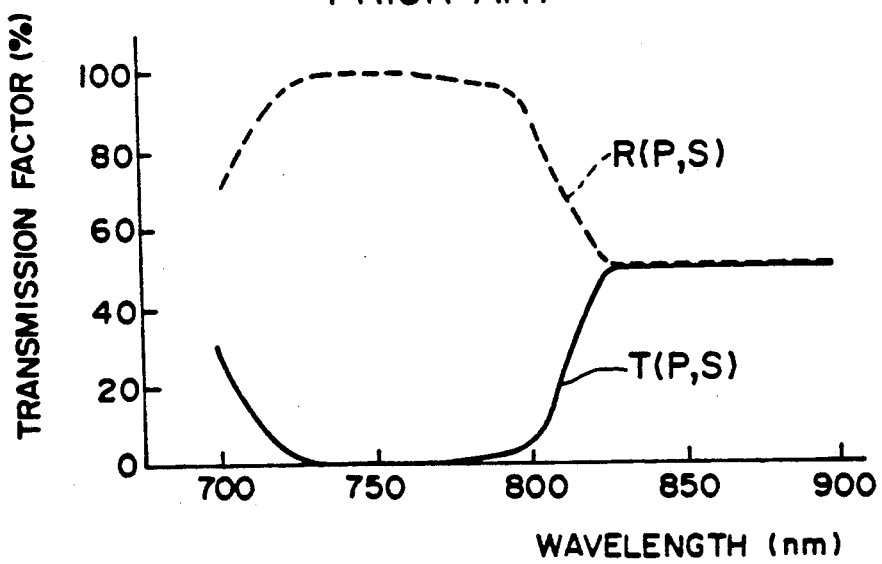

Further, where a dichroic mirror having the spectral characteristics illustrated in FIGS. 3A and 3B is used in a wave combining apparatus, the reflectance $\eta_{780}$ of the dichroic mirror at the wavelength 780 nm is high at $\eta_{780}=0.97$. However, the transmission factor $\eta_{830}$ at the wavelength 830 nm is low at $\eta_{830}=0.5$.

As both the transmission efficiency and the reflection efficiency cannot be made high with a conventional wave combining apparatus, the total wave combining efficiency $\eta$ of the conventional wave combining apparatus is approximately equal to 0.48, where $\eta$ cannot exceed 50%.

Figure 4:
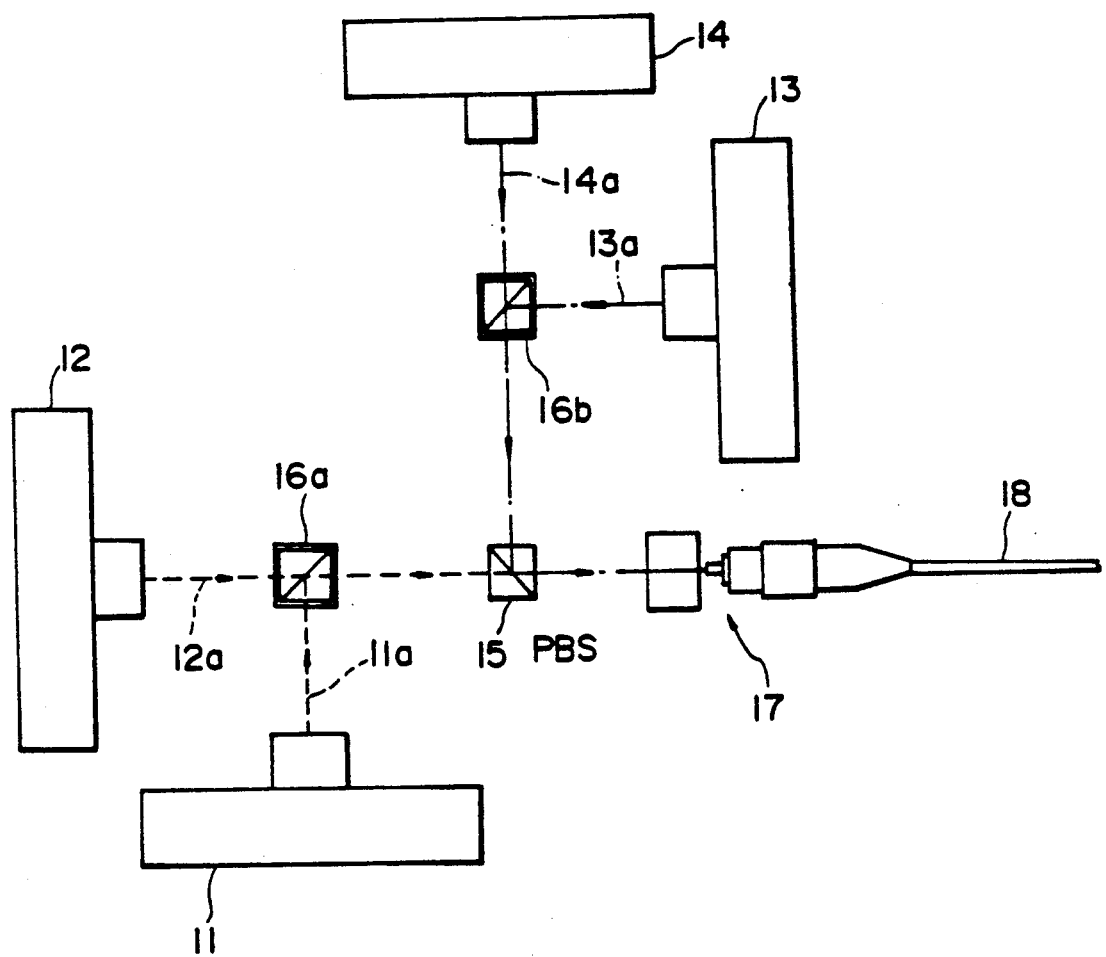
FIG. 4 is a diagrammatic view of a first exemplary embodiment of the wave combining apparatus of the present invention.

As illustrated in the first exemplary embodiment of FIG. 4, the wave combining apparatus of the present invention includes semiconductor lasers 11, 12, 13, and 14. The present invention further contemplates the use of three semiconductor lasers 11, 12, and 13. The semiconductor lasers 11, 12, 13, and 14 illustrated in FIG. 4 produce laser beams 11a, 12a, 13a, and 14a respectively. In the present invention, wave combination making use of varied wavelengths is first performed by passing the laser beams 11a, 12a, and 13a, 14a through a pair of dichroic mirrors 16a and 16b, respectively, to produce first and second resultant laser beams. The first and second resultant laser beams, which are P and S polarized, respectively, are then passed through a polarizing beam splitter prism 15, to produce a single PS laser beam.

More particularly, in the wave combining apparatus of the present invention, the first and second semiconductor lasers 11 and 12 produce P polarized laser beams 11a and 12a, respectively. The second and third semiconductor lasers 13 and 14 produce S polarized laser beams 13a and 14a, respectively. The P polarized laser beams 11a and 12a are introduced into the first dichroic mirror 16a. The S polarized laser beams 13a and 14a are introduced into the second dichroic mirror 16b. Laser beam 11a is disposed perpendicularly to laser beam 12a, while laser beam 13a is disposed perpendicularly to laser beam 14a. Further, laser beam 11a and 13a, each having a wavelength of 780 nm, are emitted from lasers 11 and 13, while laser beams 12a and 14a each having a wavelength of 830 nm, are emitted from lasers 12 and 14.

Thus, the semiconductor lasers of the wave combining apparatus of the present invention are arranged such that each perpendicularly disposed pair of semiconductor lasers 11, 12 and 13, 14 emit laser beams 11a, 12a and 13a, 14a, respectively, where laser beams 11a and 12a have the same direction of oscillation and laser beams 13a and 14a have the same direction of oscillation. Thus, wave combination by wavelength division, using the dichroic mirrors 16a and 16b, can be performed prior to combining laser beams having different directions of oscillation. Thus, a dichroic mirror having the transmission and reflection characteristics illustrated in FIGS. 3A and 3B can be used as dichroic mirror 16a for combining laser beams 11a and 12a, emitted from semiconductor lasers 11 and 12. A second dichroic mirror, having the transmission and reflection characteristic illustrated in FIGS. 2A and 2B, can be used as dichroic mirror 16b to combine laser beams 13a and 14a emitted from semiconductor lasers 13 and 14, respectively. Thus, a high reflectance and a high transmission can be achieved at both of the wavelengths 780 nm and 830 nm, as illustrated in FIGS. 2A and 3B. Consequently, a significantly improved wave combining efficiency can be achieved by selecting the appropriate dichroic mirror, by which to perform wavelength division on the incoming laser beams.

Figure 5A:
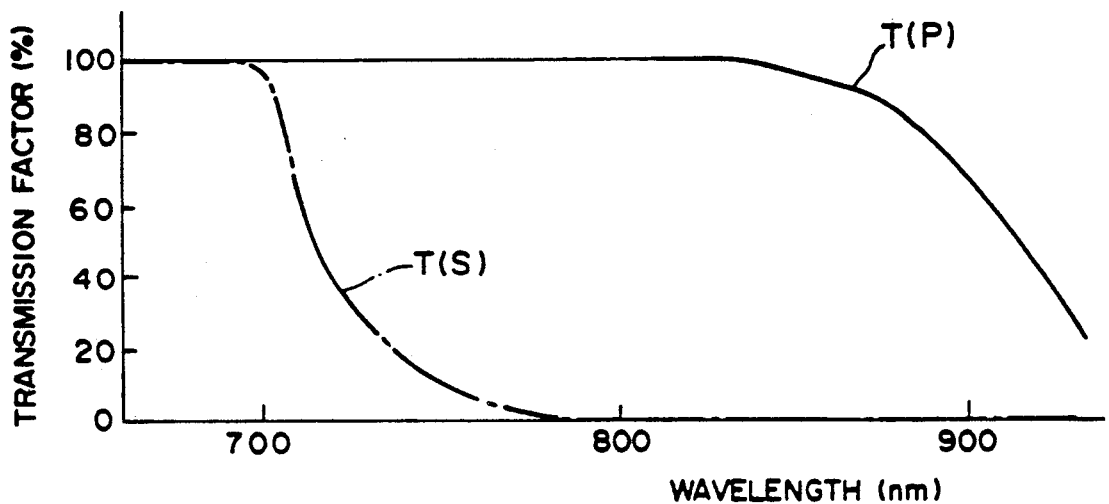
FIGS. 5A and 5B are graphs illustrating the spectral characteristics of a polarizing beam splitter prism.
Figure 5B:
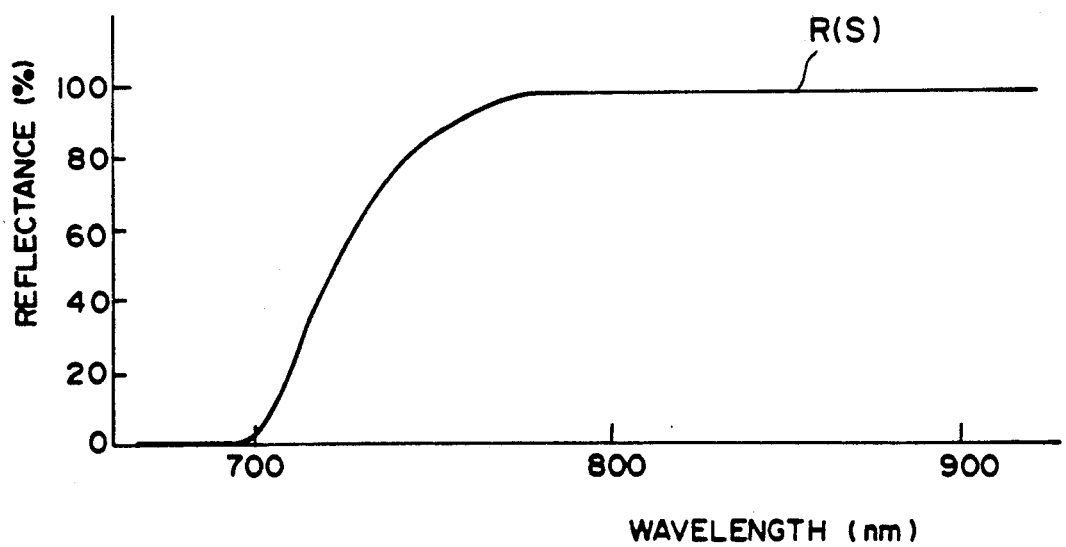

The first and second resultant beams, which are produced by passing the laser beams 11a, 12a, 13a, and 14a through the dichroic mirrors 16a, 16b, respectively, are then introduced into a polarized beam splitter prism 15. The polarizing beam splitter prism 15 combines the first and second resultant waves into a single laser beam. Thus, waves of two wavelengths, 780 nm and 830 nm are combined prior to being introduced into the polarizing beam splitter prism 15. As polarizing beam splitter prisms are available which have not only good reflection characteristics but also good transmission characteristics over a wide range of wavelengths, including the range from 780 nm to 830 nm, as illustrated in the spectral characteristic diagrams of FIGS. 5A and 5B, a polarizing beam splitter prism can be selected for use in the wave combining apparatus illustrated in FIG. 4 such that not only high reflection characteristics but also high transmission characteristics can be achieved in the wave combining apparatus of the present invention. For example, a reflection characteristic $\eta_S=0.97$ and a transmission characteristic $\eta_T=0.97$ can be achieved. Consequently, the wave combining apparatus of the present invention, as illustrated in FIG. 4, can have a high average total efficiency $\eta$ of up to 63.5%.

In a second exemplary embodiment of the present invention, a wave combining apparatus having an even higher total efficiency $\eta$ is described with respect to FIGS. 6 through 10.

Figure 6:
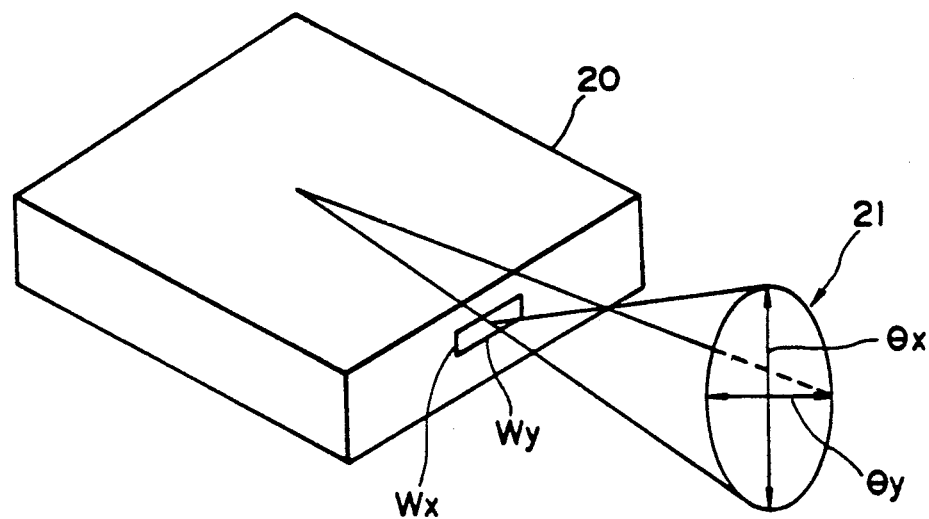
FIG. 6 is a diagrammatic view illustrating the horizontal and vertical spreading of a single laser beam.

Referring to FIG. 6, laser beam 21 is emitted from a light source of a small semiconductor laser 20. The light source of the small semiconductor laser 20 is not a point light source. Thus, if a vertical length of the light source is represented by $W_{x\,max}$ and a horizontal length of the light source is represented by $W_{y\,max}$, then the vertical length and horizontal length of the light source of the semiconductor laser 20 can be $W_{x\,max} \approx 1$ μm and $W_{y\,max} \approx 600$ μm, respectively.

While the laser beam 21 emitted from such a small light source spreads in a vertical direction, limited spread will occur in a horizontal direction. Thus, a spreading angle $\theta_x$ of the beam in a vertical direction is comparatively large, while a spreading angle $\theta_y$ of the beam in a horizontal direction is comparatively small.

Figure 7:
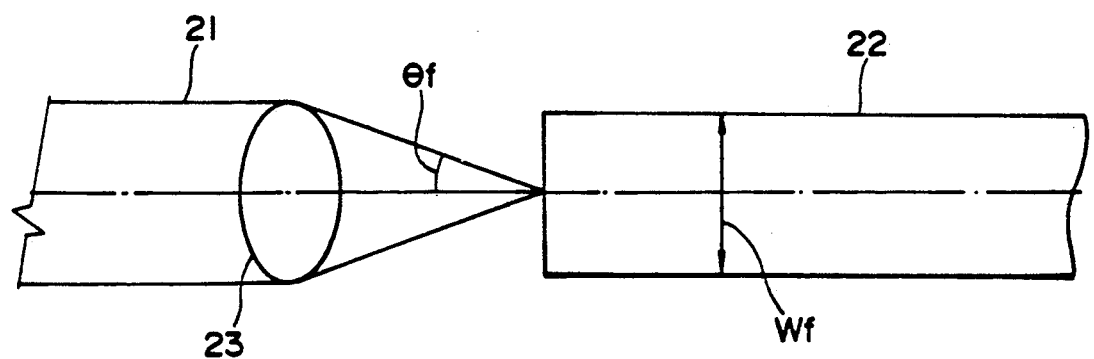
FIG. 7 is a diagrammatic view illustrating coupling of a single laser beam into an optical fiber.

Thus, in order for the laser beam 21 to be coupled in a highly efficient manner to an optical fiber 22, as illustrated in FIG. 7, two constants $m_y$ and $m_x$ must necessarily be determined such that the constants satisfy the following expressions:

$$(m_y)(W_{y\,max}) \leq Wf, \text{ and}$$

$$(1/m_x)(\sin\theta_x/8) \leq NA,$$

where Nf is a diameter of the optical fiber 22, and NA is a numerical aperture ($\sin\theta f$ in FIG. 7).

Where a semiconductor laser outputs a laser beam of 3 W, the vertical length of the beam and the horizontal length of the beam are $W_{x\,max} \approx 1$ μm and $W_{y\,max} \approx 600$ μm, respectively, as described hereinabove. As $\theta_x = 43°$ and $\theta_y = 15°$, the constants $m_y$ and $m_x$ must necessarily be chosen in different magnification system in order to satisfy the above expressions.

Figure 10:
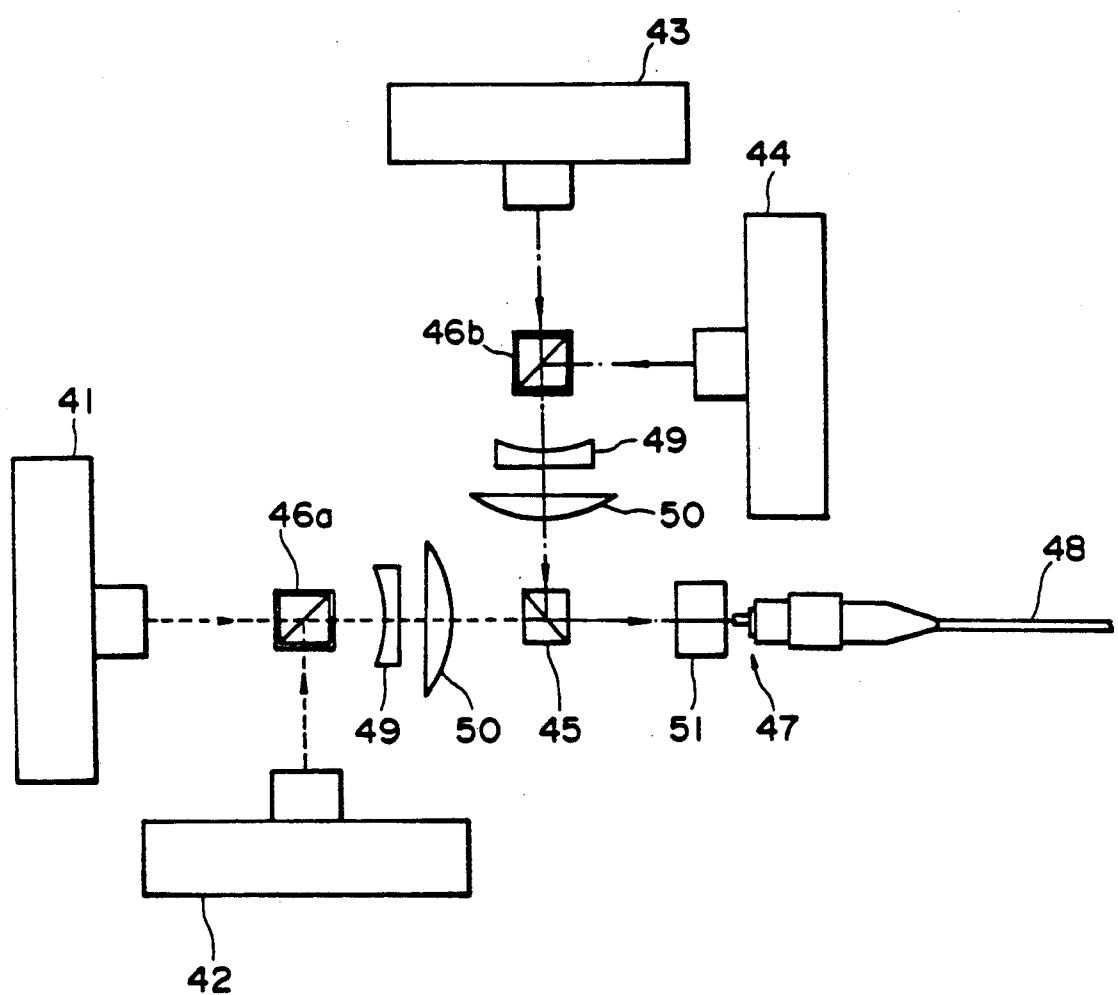
FIG. 10 is a diagrammatic view of a second exemplary embodiment of the present invention.

In the wave combining apparatus illustrated in FIG. 10, in order to satisfy the expressions set forth above, first and second cylindrical lenses 49 and 50 are interposed between a polarizing beam splitter prism 45 and each of a pair of dichroic mirrors 46a and 46b, such that different magnifications can be preset for both the vertical and horizontal directions.

A concave lens may be used for the first cylindrical lens 49, while a convex lens may be used for the second cylindrical lens 50. An optical system that includes a concave lens and a convex lens in combination is generally referred to as a beam expander. A beam expander expands a narrow beam to a larger diameter where, for example, the diameter of the expanded beam depends on the focal lengths of the lenses 49 and 50. Further, since cylindrical lenses are used in the embodiment illustrated in FIG. 10, only the diameter of a beam in a horizontal direction is decreased, while the dimension of the beam in a vertical direction is maintained, as illustrated in FIGS. 8 and 9.

As a semiconductor laser has a comparatively large dimension in the horizontal direction and a comparatively small dimension in a vertical direction (as described with reference to FIG. 1) if only the dimension of the laser beam 21 in the horizontal direction is reduced, then the laser beam 21 is to be converged by a coupled lens 36b, disposed along the optical fiber 22. Arranging a coupling lens 36a in this manner allows the single laser beam to be uniformly introduced to an effective input face of the optical fiber 22.

Figure 8:
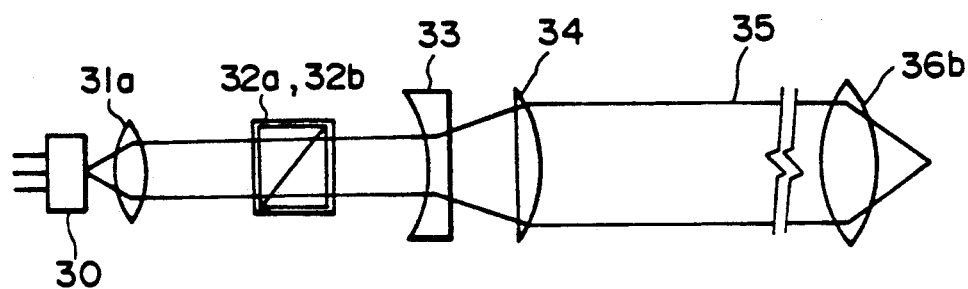
FIG. 8 is a diagrammatic view illustrating horizontal shaping of a single laser beam.
Figure 9:
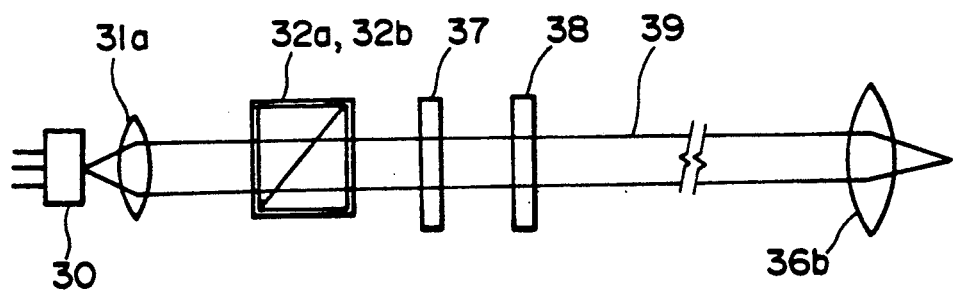
FIG. 9 is a diagrammatic view illustrating vertical shaping of a single laser beam.

In particular, referring to FIG. 8, where the focal length of a lens 31a is disposed in front of a semiconductor laser 30, and is represented by $f_1$, a focal length of a second cylindrical lens 33 is represented by $f_2$, a focal length of a third cylindrical lens 34 is represented by $f_3$, and a focal length of the coupling lens 36, disposed in front of an optical fiber, is represented by $f_4$, then a constant m may be defined by the following equation:

$$m = (f_2/f_1)(f_4/f_3)$$

Thus, the constant m can be set at, for example, 0.5. In the wave combining apparatus of FIG. 10, such shaping of the laser beam produces an improved coupling efficiency of the laser beam to the optical fiber 22, varying from 75% to 85%. Consequently, with the wave combining apparatus illustrated in FIG. 10, the average total efficiency was approximately 70%, an improvement of approximately 6.5% over the efficiency of the wave combining apparatus of FIG. 4.

By using either the embodiment of FIG. 4 or the embodiment of FIG. 10, the light concentration of laser beams emitted from semiconductor lasers can be significantly improved, thus permitting semiconductor lasers to be used effectively in various fields, such as medical treatment of optical working.

While the embodiment of FIG. 4 and in the embodiment of FIG. 10 illustrate four laser beams emitted from four semiconductor lasers converged into a single beam, it is also contemplated that three laser beams emitted from three semiconductor lasers can be converged into a single beam.

While shaping of the laser beam is performed in the embodiment of FIG. 10 such that a greater one of perpendicular dimensions of the beam is decreased, such shaping may be performed such that a smaller one of perpendicular dimensions of the beam is increased.

Thus, in accordance with the principles of the present invention, in performing wave combination to converge a number of laser beams into a single laser beam using a polarizing beam splitter prism and a dichroic mirror, wave combination making use of waveform division by a pair of dichroic mirrors is performed on laser beams having the same oscillation direction prior to combining first and second resultant laser beams in a polarizing beam splitter prism. The polarizing beam splitter prism converges the laser beams into a single laser beam.

As the laser beams that are oscillated in the same direction can be introduced into selected dichroic mirrors, a dichroic mirror for P waves and another dichroic mirror for S waves can be selectively used in accordance with the directions of oscillation of the laser beams to be combined, thus improving the reflectance for small wavelengths, and the transmission factor for large wavelengths. Therefore, the wave combining efficiency of the dichroic mirrors can be significantly improved, and the total coupling efficiency (when a plurality of laser beams are converged into a single laser beam to be coupled to an optical fiber) can be improved.

Furthermore, since a pair of cylindrical lens are interposed between the polarizing beam splitter prism and the dichroic mirrors (as illustrated in FIG. 10) so that the laser beams may be shaped by the cylindrical lenses, the coupling efficiency between the beam and the optical fiber can be improved significantly, and the total coupling efficiency can be even further improved.

Although other modifications and changes may be suggested by those skilled in the art, it is the intention of the inventors to embody within the patent warranted hereon all changes and modifications as reasonably and properly come within the scope of their contribution to the art.

We claim:

1. A wave combining apparatus comprising:
   first laser beam means for producing a plurality of P polarized laser beams;
   second laser beam means for producing a plurality of S polarized laser beams;
   first waveform division means for performing waveform division on said plurality of said P polarized laser beams to produce a first resultant laser beam;
   second waveform division means for performing waveform division on said plurality of S polarized laser beams to produce a second resultant beam; and
   waveform combination means for combining said first and second resultant laser beams to produce a combined waveform.

2. A wave combining apparatus comprising:
   at least three semiconductor lasers, wherein at least two of said lasers produce first P polarized laser beams, and another of said lasers produces second S polarized laser beams;
   a first dichroic mirror for receiving said first P polarized laser beams and for producing a first resultant beam;
   a second dichroic mirror for receiving said second S polarized laser beams and for producing a second resultant beam; and
   a polarizing beam splitter prism for combining said first and second resultant beams into a single beam, wherein said single beam is coupled to an optical fiber.

3. A wave combining apparatus comprising:
   a plurality of first lasers for producing first laser beams;
   a plurality of second lasers for producing second laser beams;
   a first dichroic mirror for combining said first laser beams to produce a resultant beam;
   a second dichroic mirror for combining said second laser beams to produce a second resultant beam;
   a polarizing beam splitter prism for combining said first and second resultant beams into a single beam, wherein said single beam is coupled to an optical fiber; and
   at least one optical component positioned between each of said first and second dichroic mirrors and said polarizing beam splitter prism, for shaping said first and second resultant beams.

4. A wave combining apparatus comprising:
   a first dichroic mirror for receiving a pair of P polarized input laser beams, wherein said P polarized laser beams are disposed perpendicularly relative to each other, said first dichroic mirror combining said P polarized input laser beams into a first resultant beam by wavelength division;
   a second dichroic mirror for receiving S polarized input laser beams, for producing a second resultant beam; and
   a polarizing beam splitter prism for receiving first and second resultant beams for combining said first and second resultant beams into a single, combined beam to be coupled to an optical fiber.

5. A wave combining apparatus according to claim 4, further comprising a number of optical components disposed between each of said dichroic mirrors and said polarizing beam splitter prism.

6. A wave combining apparatus according to claim 5, wherein each of said optical components is a cylindrical lens.

7. A wave combining apparatus according to claim 5, wherein each of said optical components is a beam expander, said beam expander including a concave lens and a convex lens, each of said concave lens and said convex lens being in the form of a cylindrical lens.

8. A wave combining apparatus according to claim 4, further comprising at least two semiconductor lasers for emitting said P polarized laser beams to be received by said first dichroic mirror, and at least two semiconductor lasers for emitting said S polarized input laser beams to be received by said second dichroic mirror.

9. A wave combining apparatus according to claim 4, further comprising at least two first semiconductor lasers for emitting said P polarized input laser beams, and a second semiconductor laser for emitting said S polarized input laser beams to be received by said second dichroic mirror.

10. A wave combining apparatus for combining a plurality of input laser beams into a single beam to be coupled to an optical fiber, comprising:
    at least two first semiconductor lasers for emitting first P polarized laser beams, said first semiconductor lasers being perpendicularly disposed along a first axis;
    a first dichroic mirror arranged to receive said first P polarized laser beams from said first semiconductor lasers for combining said first P polarized laser beams by wavelength division into a first resultant beam;
    at least two second semiconductor lasers for emitting second S polarized laser beams, said second semiconductor lasers being perpendicularly disposed along a second axis;
    a second dichroic mirror arranged to receive said second S polarized laser beams from said second semiconductor lasers and combine said second laser beams by wavelength division into a second resultant beam; and
    a polarizing beam splitter prism arranged to receive said first and second resultant beams, said polarizing beam splitter prism combining said first and second resultant beams into a single beam of combined oscillation to be coupled to an optical fiber.

11. A wave combining apparatus for combining a plurality of input laser beams into a single beam to be coupled to an optical fiber, comprising:
    a pair of first semiconductor lasers for emitting first P polarized laser beams;
    a first dichroic mirror for receiving said first P polarized laser beams and combining said first P polarized laser beams by wavelength division into a first resultant beam;
    a second semiconductor laser for emitting an S polarized laser beam;
    a second dichroic mirror for receiving said S polarized laser beam and for forming a second resultant beam; and
    a polarizing beam splitter prism arranged to receive said first and second resultant beams from said first and second dichroic mirrors, for combining said first and second resultant beams into a single beam to be coupled to an optical fiber, wherein said first and second resultant beams are disposed substantially perpendicular with respect to each other.

12. A method for combining laser beams to produce a highly efficient combined laser beam comprising the steps of:

producing first P polarized laser beams with a plurality of semiconductor lasers;

combining said first P polarized laser beams by waveform division with a dichroic mirror to produce a first resultant beam;

producing at least one S polarized laser beam;

producing a second resultant beam by passing said at least one S polarized laser beam through a second dichroic mirror; and combining said first and second resultant beams by means of a beam splitter prism to produce a combined laser beam to be coupled to an optical fiber.

* * * * *